UNITED STATES PATENT OFFICE.

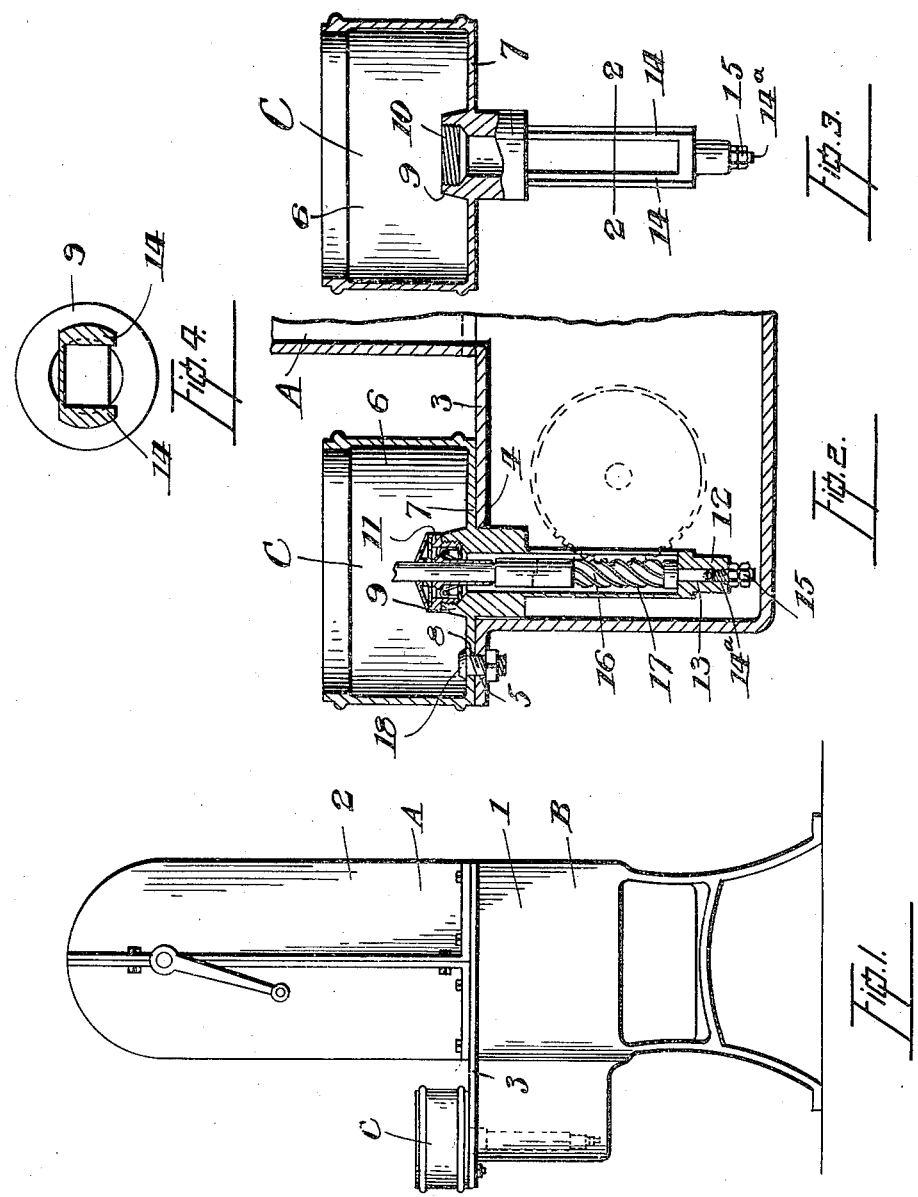

FRANK DEPEW VICKERS, OF RENFREW, ONTARIO, CANADA, ASSIGNOR TO RENFREW MACHINERY COMPANY LIMITED, OF RENFREW, ONTARIO, CANADA.

CREAM-SEPARATOR.

1,125,776.        Specification of Letters Patent.        Patented Jan. 19, 1915.

Application filed June 8, 1914. Serial No. 843,808.

*To all whom it may concern:*

Be it known that I, FRANK DEPEW VICKERS, a subject of the King of Great Britain, and resident of Renfrew, in the Province of Ontario, Dominion of Canada, have invented certain new and useful Improvements in Cream-Separators, of which the following is a specification.

This invention relates to improvements in cream separator bowl casings and the bowl spindle bearings, and the objects of the invention are to facilitate in obtaining a more perfect alinement of the neck and the bottom bowl spindle bearings, to render the gear casing perfectly oil tight, to permit of the bowl casing being removed and another substituted therefor, thereby allowing of the capacity of the machine being altered, to permit of the bowl spindle being adjusted before the said spindle is inserted into the gear case and generally to adapt the several parts to better perform the functions required of them, and it consists essentially in the improved construction of bowl casing and bearings mounted thereon particularly described and set forth in the following specification and accompanying drawings forming part of the same.

In the drawings: Figure 1 is a side elevation of a cream separator with the improved bowl casing attached thereto. Fig. 2 is a section of part of the cream separator showing the improved bowl casing in position. Fig. 3 is a view partly sectional of the improved bowl casing showing the neck and bottom bearings. Fig. 4 is a transverse section on the line 2—2 of Fig. 3.

Like characters of reference refer to like parts in the several drawings.

Referring to the drawings, A represents a cream separator comprising the gear casing B and the improved bowl casing C mounted thereon. This gear casing consists of a lower and upper portion 1 and 2, such lower portion being made of one complete casting having a cover 3 formed integral therewith, and extending partially across and overhanging the top thereof, such cover being provided with an orifice 4 extending therethrough into the said casing and being further provided with orifices 5 extending through the overhanging portions of the said cover, the object of which will be made clear hereafter. The upper portion 2 of the gear casing is preferably made dome-shaped and adapted to be secured to the lower portion 1 by set screws, bolts or the like.

The bowl casing C consists of the vertically disposed upper cylindrical part 6 open at the top, the bottom end 7 of such cylinder being provided with orifices 8 therethrough and being further provided with a concentrically located boss 9 extending on both sides of the said bottom end, the lower portion of such boss being adapted to engage with the orifices 4 in which position the orifices 8 are designed to register with the orifices 5. The boss 9 is provided with an orifice 10 through the vertical axis thereof, the upper end of such orifice being enlarged and provided with a thread extending around the inner periphery adapted to make threaded engagement with the spring neck bearing 11.

12 represents the lower bowl spindle bearing which is provided with an orifice 13 extending through the vertical axis thereof, such orifice having its lower end threaded and designed to be located directly below the orifice 10 in the boss 9.

The means which I preferably employ to support the bottom bearing 12 comprise the two vertically disposed arms 14 which are formed at their top end integral with the boss 9 and extend at substantially right angles from the lower face thereof, such arms at their lower end being formed integral with the bearing 12 and located on diametrically opposite sides of the orifices 10 and 13.

14$^a$ represents a pin which is designed to make threaded engagement with the lower end of the orifice 13, such pin being provided on the bottom end with lock nuts 15 adapted to fixedly secure the said pin in any desired position.

The bowl spindle 16 is adapted to carry the helical gear 17 rigidly mounted thereon, the lower end of such spindle being rotatably mounted in the orifice 13 of the bearing 12, such spindle being also rotatably mounted intermediate of its ends in the neck bearing 11. This spindle is designed to be rotated through the medium of the usual gearing mounted in the gear casing A which is designed to mesh with the helical gear 17, such gearing and spindle being well known in the art required no further description.

The machine is assembled in the following manner: The spindle 16 carrying the helical gear 17 is inserted through the boss 9 of the bowl casing C, the lower end of the said spindle being mounted in the orifice 13 of the bearing 12 when the neck bearing 11 is secured in position in the upper threaded end of the orifice 10. A ball is inserted in the lower end of the orifice 13 and is designed to be located between the spindle end and the pin 14ª thereby eliminating any undue friction caused by the rotation of the spindle 16 on the said pin. This bowl casing is now placed in position with the lower part of the boss 9 engaging with the orifice 4 and the orifice 8 registering with the orifices 5, the said bowl casing being secured to the lower gear casing by means of bolts 18 adapted to engage with the orifices 8 and 5.

It will be seen from the above description that the lower gear casing is formed perfectly oil tight so that it is quite impossible for any leakage to take place while the bowl casing C is so constructed that it can be easily disconnected from the gear casing and a larger or smaller bowl casing substituted therefor, in this way permitting of the capacity of any machine being altered as occasion demands. It will also be perfectly clear that any adjustment of the spindle 16 can be easily accomplished before the bowl casing C is connected to the gear casing A.

As many changes could be made in the above construction and many apparently widely different embodiments of my invention, within the scope of the claims, constructed without departing from the spirit or scope thereof, it is intended that all matter contained in the accomnanying specification and drawings shall be interpreted as illustrative and not in a limiting sense.

What I claim as my invention is:

1. In a cream separator and in combination, a lower gear casing formed of one complete casting having a cover extending partially across and overhanging the top thereof, an upper gear casing adapted to be secured to the lower gear casing, an interchangeable bowl casing adapted to be secured to the lower gear casing, and a spindle rotatably mounted in said bowl casing, substantially as described.

2. In a cream separator and in combination, a lower gear casing formed of one complete casting having a cover extending partially across and overhanging the top thereof, such cover being provided with an orifice extending therethrough into the said casing, an upper gear casing designed to be secured to the lower gear casing, a bowl casing open at the top, a boss mounted on the lower end of said casing, and having an orifice through the vertical axis thereof, such boss being designed to engage with the orifice in the said cover, a spindle adapted to be mounted in the said boss and means for securing the said bowl casing to the lower gear casing, as and for the purpose specified.

3. In a cream separator and in combination, a lower gear casing formed of one complete casting having a cover extending partially across and overhanging the top thereof, such cover being provided with an orifice therethrough extending into the said casing, the overhanging portion of the said cover being provided with orifices, an upper gear casing substantially dome-shaped adapted to be secured to the lower gear casing, a bowl casing open at the top, a boss concentrically located and extending on opposite sides of the lower end of the said bowl casing and having an orifice therethrough, such boss being designed to engage with the first said orifice in the said cover, the lower end of the said bowl casing being provided with orifices designed to register with the orifice in the said overhanging portion of the cover, bolts adapted to engage with the last said orifices and a spindle designed to be rotatably mounted in the said boss, as and for the purpose specified.

4. In a cream separator and in combination, a lower gear casing formed of one complete casting having a cover extending partially across and overhanging the top thereof, such cover being provided with an orifice extending therethrough into the said casing, a bowl casing comprising a vertically disposed upper cylindrical portion open at the top end, a boss mounted in the lower end of such cylindrical portion and extending on opposite sides thereof, and being provided with an orifice extending through the vertical axis, such boss being designed to engage with the orifice in the said cover, a lower bearing having an orifice through the center thereof, such lower bearing being designed to be located directly below the orifice in the said boss, means for supporting the said lower bearing from the said loss, and a spindle designed to be rotatably mounted in said boss and lower bearing as and for the purpose specified.

5. In a cream separator and in combination, a lower gear casing formed of one complete casting having a cover extending partially across and overhanging the top thereof, such cover being provided with an orifice extending into the said casing, a bowl casing having its top end formed of a vertically disposed cylindrical portion open at the top, a boss concentrically located and extending on opposite sides of the lower end of said cylindrical portion, and having an orifice therethrough, such boss being designed to engage with the orifice in the said cover, a lower bearing having an orifice through the vertical axis thereof adapted to be located directly below the orifice in the said boss, the lower end of the said lower bearing being threaded, a pin designed to make threaded engagement with the lower end of the said bottom bearing, lock nuts designed to engage with the said pin, means for supporting the lower bearing from the said boss, and a spindle designed to be rotatably mounted in the said boss and the said lower bearing, as and for the purpose specified.

6. In a cream separator and in combination, a lower gear casing formed of one complete casting having a cover extending partially across and overhanging the top thereof, such cover being provided with an orifice extending into the said casing, a bowl casing having its top end formed of a vertically disposed cylindrical portion open at the top, a boss concentrically located and extending on opposite sides of the lower end of said cylindrical portion, such boss having an orifice therethrough, a lower bearing having an orifice through the vertical axis thereof adapted to be located directly below the orifice in the said boss, the lower end of the said lower bearing being threaded, a pin designed to make threaded engagement with the lower end of the said bottom bearing, lock nuts designed to engage with the said pin, vertically disposed arms having their top ends formed integral with the lower bearing, such arms being located on diametrically opposite sides of the orifice in the said boss and the orifice in the said lower bearing, and a spindle designed to be rotatably mounted in the said boss and lower bearing, as and for the purpose specified.

In witness whereof I have hereunto set my hand in the presence of two witnesses.

FRANK DEPEW VICKERS.

Witnesses:
E. J. STEWART,
MINNIE MACFARLANE.

Copies of this patent may be obtained for five cents each, by addressing the "Commissioner of Patents, Washington, D. C."